Oct. 6, 1964

M. F. ROYSTON 3,151,383

CAPACITOR NUT

Filed May 1, 1961

Inventor:
Marvin F. Royston
By Robert F. Miehle, Atty.

Oct. 6, 1964

M. F. ROYSTON 3,151,383

CAPACITOR NUT

Filed May 1, 1961

Inventor:
Marvin F. Royston
By Robert F. Miehle, Atty.

United States Patent Office 3,151,383
Patented Oct. 6, 1964

3,151,383
CAPACITOR NUT
Marvin F. Royston, Skokie, Ill., assignor to Bell & Howell Company, Chicago, Ill., a corporation of Illinois
Filed May 1, 1961, Ser. No. 106,943
4 Claims. (Cl. 29—25.42)

This invention relates to a capacitor nut and method of making the same.

An object of the invention is to provide a rugged, inexpensive capacitor nut and method of making the same.

Another object of the invention is to provide a capacitor nut comprising a body member of plastic material having thread facings of metal embedded therein.

A further object of the invention is to provide a method of making a capacitor nut in which a plastic compound is cast over an externally threaded metal member. The member is bored out to leave only the thread portions which are embedded in the plastic compound, and internal threads are cut through the thread portions and into the plastic compound to leave rugged metal capacitor facings on opposed walls of the thread groove.

A complete understanding of the invention may be obtained from the following detailed description of a capacitor nut and method of making the same forming specific embodiments thereof, when read in conjunction with the appended drawings, in which.

My invention provides a capacitor nut and a novel and expedient method of manufacturing such a capacitor nut in which an external thread is formed on an elongated member of an electroconductive material. A non-conductive material, such as an electrical insulating plastic compound is then formed over the conductive member, filling the external grooves of the thread. The conductive material is then bored out, leaving only the conductive thread portion carried by the non-conductive member. An internal thread groove is cut into the conductive thread, separating the conductive thread into two facing helices, which serve as rugged capacitor plates of very low electrical resistance.

Figure 4:
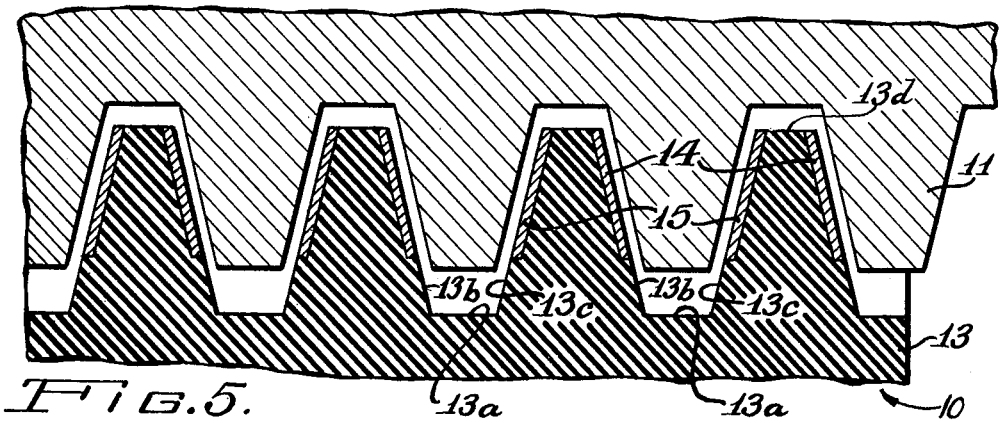
FIGS. 4 and 5 are longitudinal sectional views of different scales of a capacitor nut forming one embodiment of the invention together with a capacitor screw.
Figure 5:
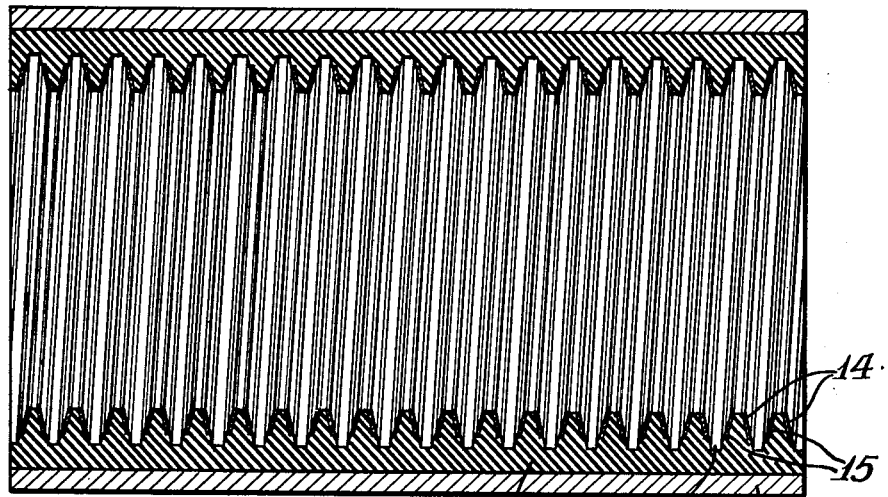
Figure 6:
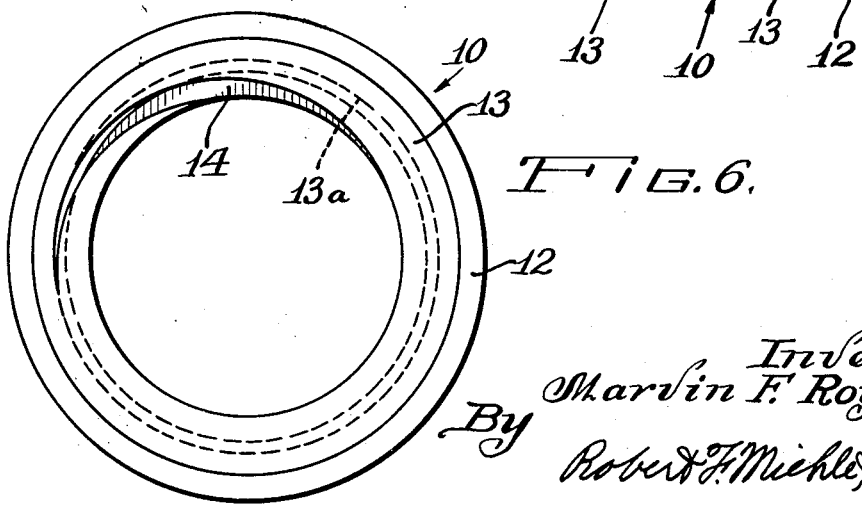
FIG. 6 is an end view of the nut of FIGS. 4 and 5.

Referring now in detail to the drawings, a capacitor nut 10 (FIGS. 4 to 6) for use with a capacitor screw 11 has an outer metal mounting sleeve 12 into which is molded a plastic sleeve 13 of an electrical insulating material, which preferably is a known organic plastic compound of thermoplastic or thermo-setting material, preferably being a known epoxy compound. The sleeve 13 has an internal thread groove 13a therein with portions of opposite faces or walls 13b and 13c thereof covered by thick facings 14 and 15 of brass or other strong, highly electroconductive metal which are embedded into the faces 13b and 13c. The capacitor nut 10 is extremely rugged precise and durable with the facings 14 and 15 having very low resistances.

Figure 1:
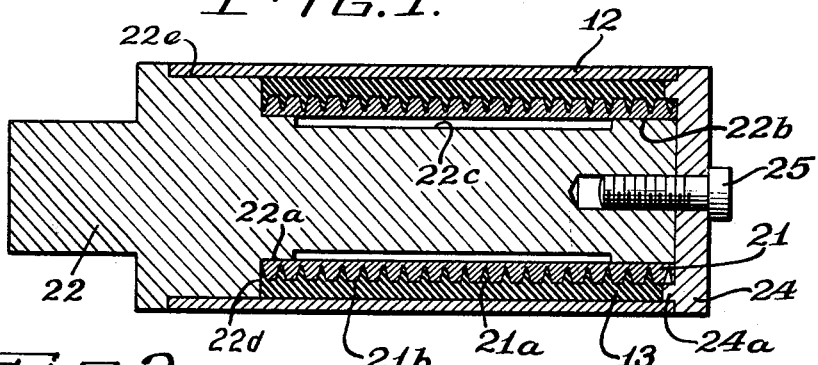
FIGS. 1, 2 and 3 are sectional views illustrating several steps in a method forming one embodiment of the invention.
Figure 2:
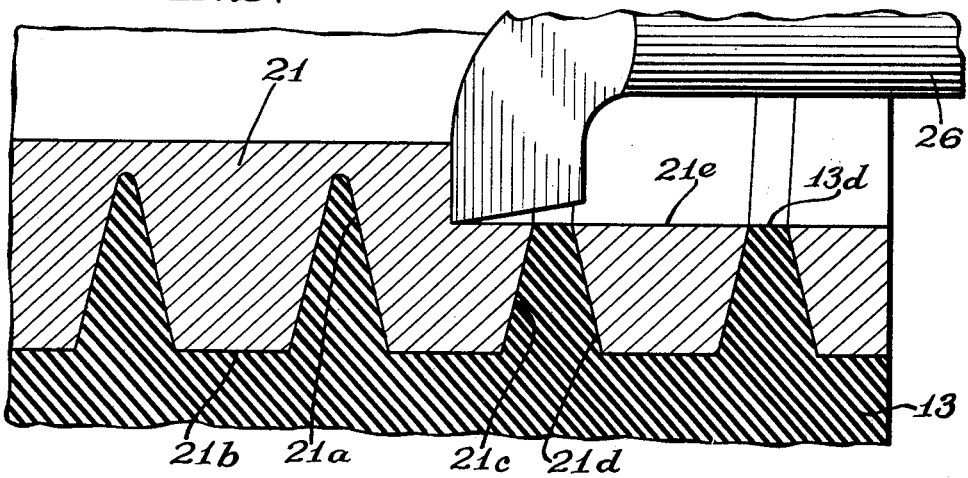
Figure 3:
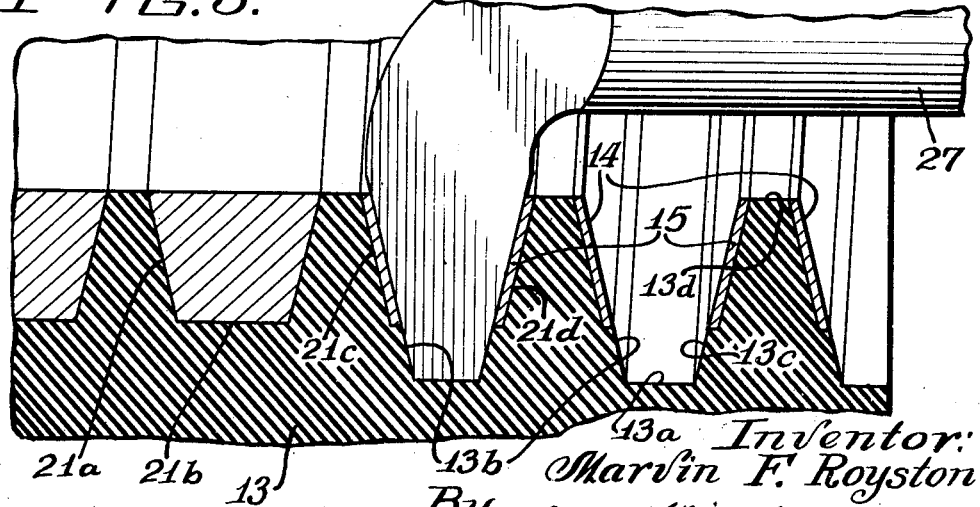

In making the capacitor nut 10 in accordance with a method forming one embodiment of the invention, a sleeve 21 (FIGS. 1 and 2) of brass or other strong, highly electroconductive metal is provided with an external thread groove 21a of the same lead as the groove 13a (FIG. 3) but quite narrow to leave rather a wide land 21b, opposed sidewalls 21c and 21d of the groove 21a to form the embedded faces of the facings 14 and 15. Next a core or mandrel 22 having precise cylindrical ring or collar portions 22a and 22b is inserted into the sleeve member 21 with the collar portions fitting closely in the member 21, an undercut portion 22c also being provided to reduce friction. The end of the member 21 abuts shoulder 22d. Then the outer sleeve 12 is fitted closely onto elongated cylindrical collar portion 22e concentric with the collar portions 22a and 22b. The sleeve 13 then is formed by pouring or injecting the plastic compound in a liquid state into the space between the sleeve member 21 and the sleeve 12. Preferably the plastic compound is one of the well known casting compounds of epoxy resin of high dielectric strength. Cap 24 having spacing ring 24a is placed on the ends of the sleeves 21 and 12 as shown in FIG. 1 and is secured in this position by cap screw 25. The casting compound then is allowed to set or cure to form the very tough, strong sleeve 13 strongly adhered to the sleeve 12 and faces 21c and 21d of the member 21.

After the casting compound has set, the cap 24 is removed from the assemblage and the righthand ends of the sleeves 12 and member 13 are cut off back to the righthand end of the molded sleeve 13. The core 22 then is removed, and the assemblage of the three elements 12, 13 and 21 are mounted in a machine tool and a boring tool 26 is used to bore out the member 21 to leave only a helical thread 21e embedded in the sleeve 13 with its adjacent turns separated and electrically insulated from one another by wide land 13d. An internal thread cutting tool 27 (FIG. 3) then is used to cut the thread groove 13a through and beyond the thread 21e to leave the facings 14 and 15 firmly embedded in the plastic compound and separated electrically. The lefthand end of the sleeve 12 then is trimmed off.

The above-described capacitor nut 10 is very rugged and durable, is easily press fit mounted, has the capacitor plate facings 14 and 15 of negligible resistance, and may be constructed very inexpensively by the above-described method.

While the invention is thus described, it is not wished to be limited to the precise details described, as changes may be readily made without departing from the spirit of the invention.

What is claimed is:

1. The method of making a capacitor nut, which comprises exteriorly threading a cylindrical member of electroconductive metal, molding a sleeve of high dielectric strength plastic material around the cylindrical member and filling the groove of the thread, boring out the member to leave only the helical portion thereof on opposite sides of the groove of the thread, and cutting an internal thread groove through the helical portion to leave only two opposed helical ribbons of the metal forming capacitor plate facings forming portions of the side walls of the internal thread groove.

2. The method of making a threaded capacitor member, which comprises embedding a helical member of electroconductive material into a cylindrical member of plastic material, and cutting a helical groove through the helical member to form two ribbons of electroconductive material positioned at the opposing side faces of the helical groove.

3. The method of making a threaded capacitor member, which comprises threading a cylindrical surface of a metal member of electroconductive metal, molding an electrically insulating plastic compound on the cylindrical surface to form a backing and fill the groove formed by the threading, and removing all of the metal member except two ribbons forming the faces of the groove.

4. The method of making a capacitor nut, which comprises forming an external thread groove on a sleeve-like brass member, mounting the member in a sleeve in centered relationship with the exterior periphery of the member spaced substantially from the interior periphery of the sleeve, casting an epoxy compound in the space between the member and the sleeve, boring out the member to leave only a thread portion thereof which is embedded in the epoxy compound, and cutting an internal thread through the thread portion to leave two capacitor facings embedded in the epoxy compound.

References Cited in the file of this patent

UNITED STATES PATENTS

| | | |
|---|---|---|
| 2,303,391 | Rosenthal | Dec. 1, 1942 |
| 2,438,592 | White | Mar. 30, 1948 |
| 2,653,306 | Piety | Sept. 22, 1953 |
| 2,753,616 | Tognola | July 10, 1956 |
| 2,915,808 | Clemons | Dec. 8, 1959 |